UNITED STATES PATENT OFFICE.

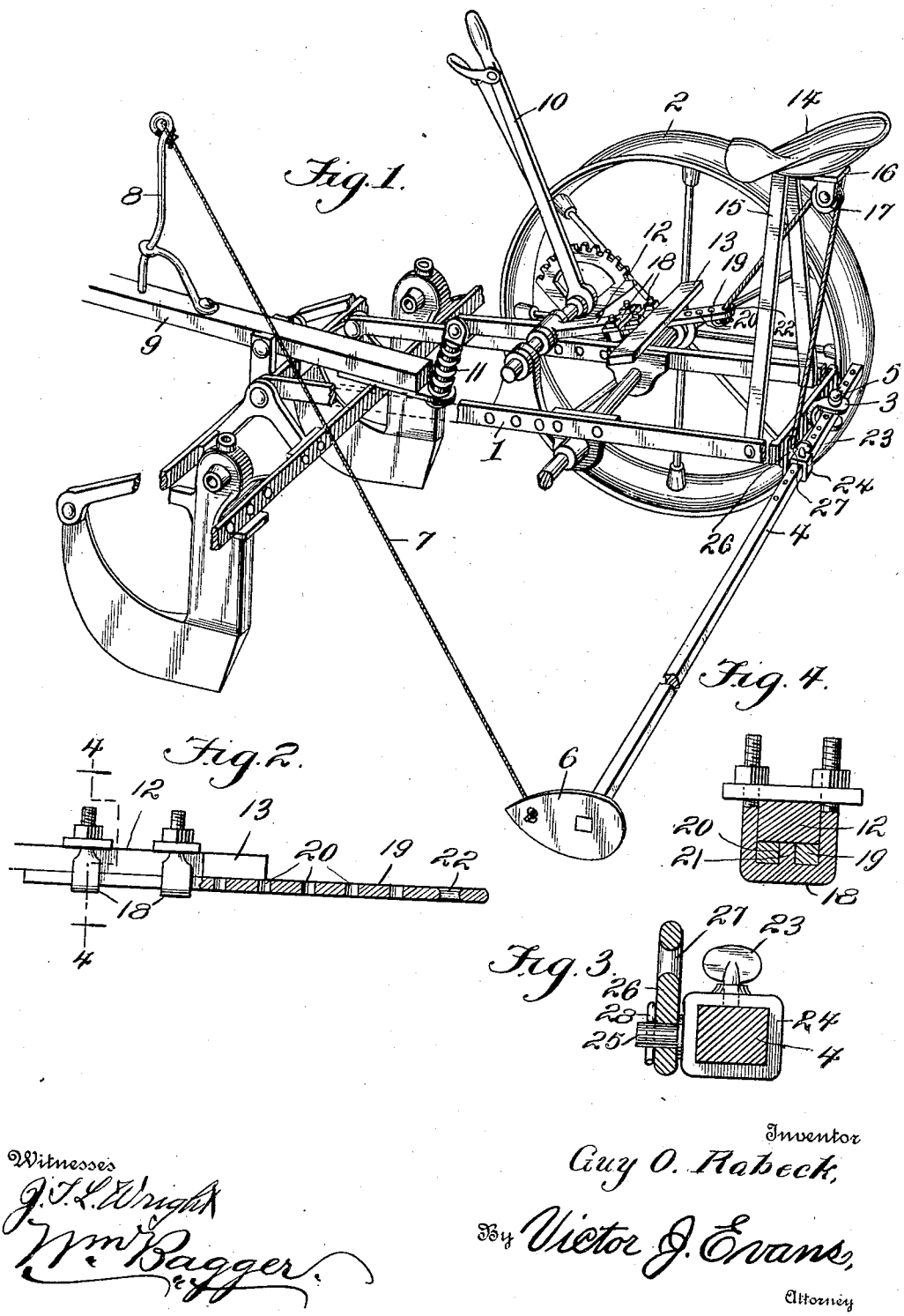

GUY O. RABECK, OF LE LOUP, KANSAS.

MARKER FOR PLANTERS.

969,656.  Specification of Letters Patent.  Patented Sept. 6, 1910.

Application filed March 28, 1910. Serial No. 552,092.

*To all whom it may concern:*

Be it known that I, GUY O. RABECK, a citizen of the United States of America, residing at Le Loup, in the county of Franklin and State of Kansas, have invented new and useful Improvements in Markers for Planters, of which the following is a specification.

This invention relates to land marking devices for planters, and it has for its object to produce a device of this class which shall possess superior advantages in point of simplicity, durability and general efficiency.

With these and other ends in view, which will readily appear as the nature of the invention is better understood, the same consists essentially in an improved lifting device connecting the marker bar with the lever which is customarily employed for the purpose of raising and lowering the planting mechanism with reference to the carrying frame of a planter, or with an extension of said lever so that by actuating said lever the marker bar will be lifted from the ground simultaneously with the raising of the planting mechanism to an approximately vertical position from which, when the planting mechanism is again lowered, the said marker bar may be lowered adjacent to either side of the planter.

With these and other ends in view, which will readily appear as the nature of the invention is better understood, the same consists in the improved construction and novel arrangement and combination of parts which will be hereinafter more fully described and particularly pointed out in the claim.

In the accompanying drawing,—Figure 1 is a perspective view, showing a portion of a conventional planter to which the invention has been applied. Fig. 2 is a detail view in sectional elevation, showing a portion of the operating lever and the clamping device connected therewith. Fig. 3 is a sectional view taken transversely through the marker bar, and showing the swivel device connected therewith. Fig. 4 is a sectional detail view taken on the line 4—4 in Fig. 2.

Corresponding parts in the several figures are denoted by like characters of reference.

The planter frame 1, which is supported on carrying wheels 2, is provided with a clevis 3 swiveled upon the rear cross bar thereof and in which the marker bar 4 is pivotally mounted by means of a pin 5. The bar 4 carries at its outer end a land marker 6, of ordinary construction, said marker being connected by a wire or cable 7 with an upright or standard 8 rising from the planter tongue 9.

The lever 10, which is utilized for raising and lowering the planting mechanism, is connected in the customary manner with the rear end of the tongue; a spring 11 being interposed. Said lever is in this instance shown as being provided with a rearward extending arm 12 having a foot piece or treadle 13 convenient to the driver whose seat 14 is shown mounted upon an upright support 15 having a rearward extending bracket 16 upon the underside of which a guide member, such as a pulley 17, is suitably supported, preferably by means including a swivel joint. Secured upon the arm 12 by means of clips 18 is an extension bar 19, the same being preferably provided with suitably spaced apertures 20 for the reception of lugs 21 that extend upwardly from the cross bars of the clips, thus enabling the said extension bar to be held very securely at various adjustments. Said bar has a terminal eye 22 at its rear end.

Slidably secured upon the marker bar 4 by means of a set screw 23 is a sleeve 24 having a forwardly extending pintle 25 upon which a link member 26 having an eye 27 is swiveled, said member being retained in position by means of a cotter pin 28. The eye 27 of the link 26 is connected with the eye 22 of the extension bar 19 by means of a flexible member, such as a cable 29, which is guided over the pulley 17.

From the foregoing description taken in connection with the drawing hereto annexed, the operation and advantages of this invention will be readily understood. It will be obvious that when the lever 10 is actuated to raise the planting mechanism, strain in an upward direction will be exercised upon the marker bar, and it will likewise be obvious that by proper adjustment of the extension bar 19 and the sleeve 24 with reference to the lever and the marker bar, respectively, the lever pitch may be regulated so that when the planting mechanism has been properly lifted from the ground, the marker bar will assume a nearly vertical position in rear of the driver's seat a little past the center on the opposite side. By swinging a little past the center of the driver's seat and locking or securing by means of the lever, the marker bar will be held inactive until the machine is turned in position for the next row, when by lowering the planter mechanism, the marker will assume in descending a proper position for operation.

Having thus described the invention, what is claimed as new, is:—

In a planter, a marker bar having swivel connection with the planter frame, a lever arranged to raise and lower the planting mechanism, an extension bar having a plurality of apertures and a terminal loop, clips connecting the extension bar with an arm extending rearwardly from the adjusting lever, said clips having lugs to engage the apertures in the extension bar, a sleeve adjustably secured upon the marker bar and having a forwardly extending spindle, a link swiveled upon said spindle, and a suitably guided flexible element connecting the link with the eye or loop at the rear end of the extension bar.

In testimony whereof I affix my signature in presence of witnesses.

GUY O. RABECK.

Witnesses:
 DELIA E. BRODERICK,
 MERTON R. HARRIS,
 W. E. GRIFFITH.